(12) United States Patent
Kurian

(10) Patent No.: US 10,069,958 B1
(45) Date of Patent: Sep. 4, 2018

(54) DYNAMIC MOBILE AUTHORIZATION ADVANCEMENT SYSTEM

(71) Applicant: BANK OF AMERICA CORPORATION, Charlotte, NC (US)

(72) Inventor: Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 15/654,988

(22) Filed: Jul. 20, 2017

(51) Int. Cl.
*H04M 1/725* (2006.01)
*H04L 29/06* (2006.01)

(52) U.S. Cl.
CPC .... *H04M 1/72527* (2013.01); *H04L 63/0892* (2013.01); *H04L 65/4092* (2013.01); *H04M 1/72533* (2013.01)

(58) Field of Classification Search
CPC .......... H04M 1/72527; H04M 1/72533; H04L 65/4092; H04L 63/0892
See application file for complete search history.

(56) References Cited

U.S. PATENT DOCUMENTS

| | | | |
|---|---|---|---|
| 4,390,968 A | 6/1983 | Hennessy et al. | |
| 4,825,050 A | 4/1989 | Griffith et al. | |
| 5,181,238 A | 1/1993 | Medamana et al. | |
| 5,793,028 A | 8/1998 | Wagener et al. | |
| 6,012,144 A | 1/2000 | Pickett | |
| 6,633,223 B1 | 10/2003 | Schenker et al. | |
| 6,957,199 B1 | 10/2005 | Fisher | |
| 7,475,246 B1* | 1/2009 | Moskowitz | G06F 21/10 348/E7.056 |
| 7,617,135 B2 | 11/2009 | Harris | |
| 7,827,115 B2 | 11/2010 | Weller et al. | |
| 8,341,389 B2* | 12/2012 | Filee | G06F 21/34 705/905 |
| 8,666,851 B2 | 3/2014 | Carter | |
| 8,788,350 B2 | 7/2014 | McKenna et al. | |
| 9,646,300 B1 | 5/2017 | Zhou et al. | |
| 2005/0068983 A1* | 3/2005 | Carter | H04L 63/102 370/480 |
| 2006/0235741 A1* | 10/2006 | Deaton | G01C 15/00 705/7.13 |
| 2006/0272022 A1* | 11/2006 | Loukianov | G06F 21/575 726/26 |
| 2009/0265761 A1 | 10/2009 | Evanitsky | |
| 2009/0313132 A1 | 12/2009 | McKenna et al. | |

(Continued)

*Primary Examiner* — Lewis West
(74) *Attorney, Agent, or Firm* — Michael A. Springs; Moore & Van Allen PLLC; Nicholas C. Russell

(57) ABSTRACT

Embodiments of the invention are directed to a system, method, or computer program product for dynamic mobile authorization advancement for service providers. The invention solves a technical problem of authenticity, authorization, and security of a transaction and the auditing process associated therewith within a home service providing network. In this way, the system generates confirmation of an authenticity of provider, an authorized service completion, resource deployment confirmation, and reconciliation retention. Thus, establishing an end-to-end holistic service providing network application experience in a four axis system that ties in to service process with smart device integration for insurance of service rendering and material completion.

20 Claims, 5 Drawing Sheets

(56) References Cited

U.S. PATENT DOCUMENTS

| | | | |
|---|---|---|---|
| 2012/0023568 A1* | 1/2012 | Cha | G06F 21/335 726/10 |
| 2012/0158654 A1 | 6/2012 | Behren et al. | |
| 2012/0173436 A1 | 7/2012 | Smith | |
| 2013/0097698 A1* | 4/2013 | Taveau | G06Q 30/06 726/19 |
| 2013/0104190 A1* | 4/2013 | Simske | G06Q 10/10 726/1 |
| 2013/0197998 A1* | 8/2013 | Buhrmann | G06Q 30/0255 705/14.53 |
| 2014/0130142 A1* | 5/2014 | Plewnia | G06F 21/335 726/5 |
| 2014/0279106 A1 | 9/2014 | Smelcer | |
| 2015/0058923 A1* | 2/2015 | Rajagopal | H04L 63/168 726/1 |
| 2015/0332240 A1 | 11/2015 | Harwood et al. | |
| 2016/0055583 A1 | 2/2016 | Liberty et al. | |
| 2016/0224965 A1 | 8/2016 | Chauhan et al. | |
| 2017/0041452 A1* | 2/2017 | Amann | H04W 4/70 |
| 2017/0046767 A1 | 2/2017 | Xiao et al. | |

* cited by examiner

DYNAMIC MOBILE AUTHORIZATION ADVANCEMENT SYSTEM

BACKGROUND

With advancements in machine technology and deployment, more and more machines and products are being interconnected via internet channels. As such, diagnostics and communications with machinery, products, and the like are becoming more advanced. This allows for quick diagnostics and communications for maintenance and repair. However, there exists a need for service interconnectivity.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for generating resource tags and integration of the tags on products for resource valuation and distribution.

In some embodiments, the invention solves a technical problem of authenticity, authorization, and security of a transaction and the auditing process associated therewith. In this way, the system generates confirmation of an authenticity of a person, an authorized work completion, service payment completion, and transactional security. As such, creating an end-to-end holistic service providing experience. The system creates an audit and verification of a transaction based on the work effort in a four axis system that ties in to work product to ensure a service is rendered since the system is unbiased arbitrator based on an ingested statement of work.

In some embodiments, the invention provides geo-location tying to a recording cloud of activities associated with service providing to ensure fulfillment and delivery of services. As such, with the system may be an arbitrator, if necessary, recording the steps of the service agreement and service provided.

Embodiments of the invention relate to systems, methods, and computer program products for dynamic mobile service authorization, the invention comprising: enrolling a service provider and identify one or more smart devices associated with the service provider; receiving a statement of work for service to be performed by the service provider for a user; generating a communicable linkage between a user device, a service provider device, and one or more smart devices, wherein the one or more smart devices are associated with the service provider and/or located at a location of the service to be performed; monitoring a location of the service provider via one or more smart devices associated with the service provider; capturing during service, by accessing and manipulating devices within the generated communicable linkage, one or more phases of the service being performed by the service provider; transmitting a signal to the user device for confirmation of the one or more phase associated with the service, wherein the confirmation comprises a captured portion of the service; transmitting a confirmation signal to the service provider device allowing completion of the service, wherein the confirmation signal is based on a confirmation of the one or more phases by the user; deploying one or move resource invoices for the services provided; and storing the statement of work, the captured one or more phases of the service, and the confirmation of the one or more phases the statement of work for legal reconciliation.

In some embodiments, storing the statement of work, the captured one or more phases of the service, and the confirmation of the one or more phases the statement of work for legal reconciliation further comprises storing an unbiased record of the service, statement of work, and compliance with the statement of work for the service provided to the user.

In some embodiments, capturing the service further comprises capturing via image and real-time video stream one or more portions of the service by an accessed and manipulated user device, a service provider device, and one or more smart devices.

In some embodiments, the invention further comprises providing a notification to the service provider to stop the service based on a required phase completion and phase confirmation of the user.

In some embodiments, the invention further comprises generating an interactive interface for term definition of service and indication of phases of service upon generation of the communicable linkage between the user device and the service provider device.

In some embodiments, monitoring the location of the service provider via one or more smart devices associated with the service provider further comprises the one or more smart devices associated with a vehicle of the service provider.

In some embodiments, receiving the statement of work for service to be preformed by the service provider for the user further comprises automatically enrolling the user for the dynamic mobile service authorization based on the statement of work.

In some embodiments, wherein the service further comprises one or more manual tastes for completion at a user resident or location.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
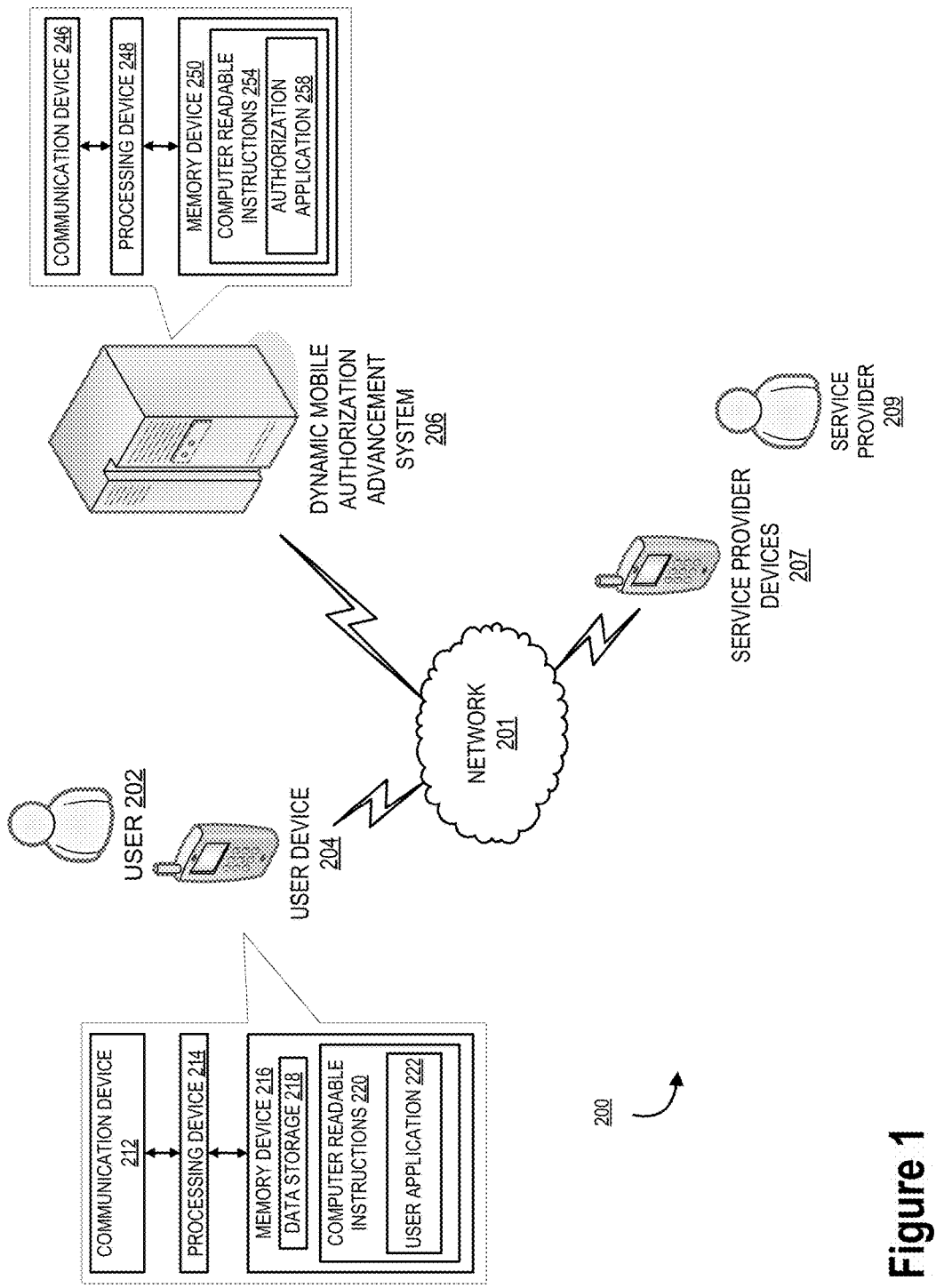
Figure 2:
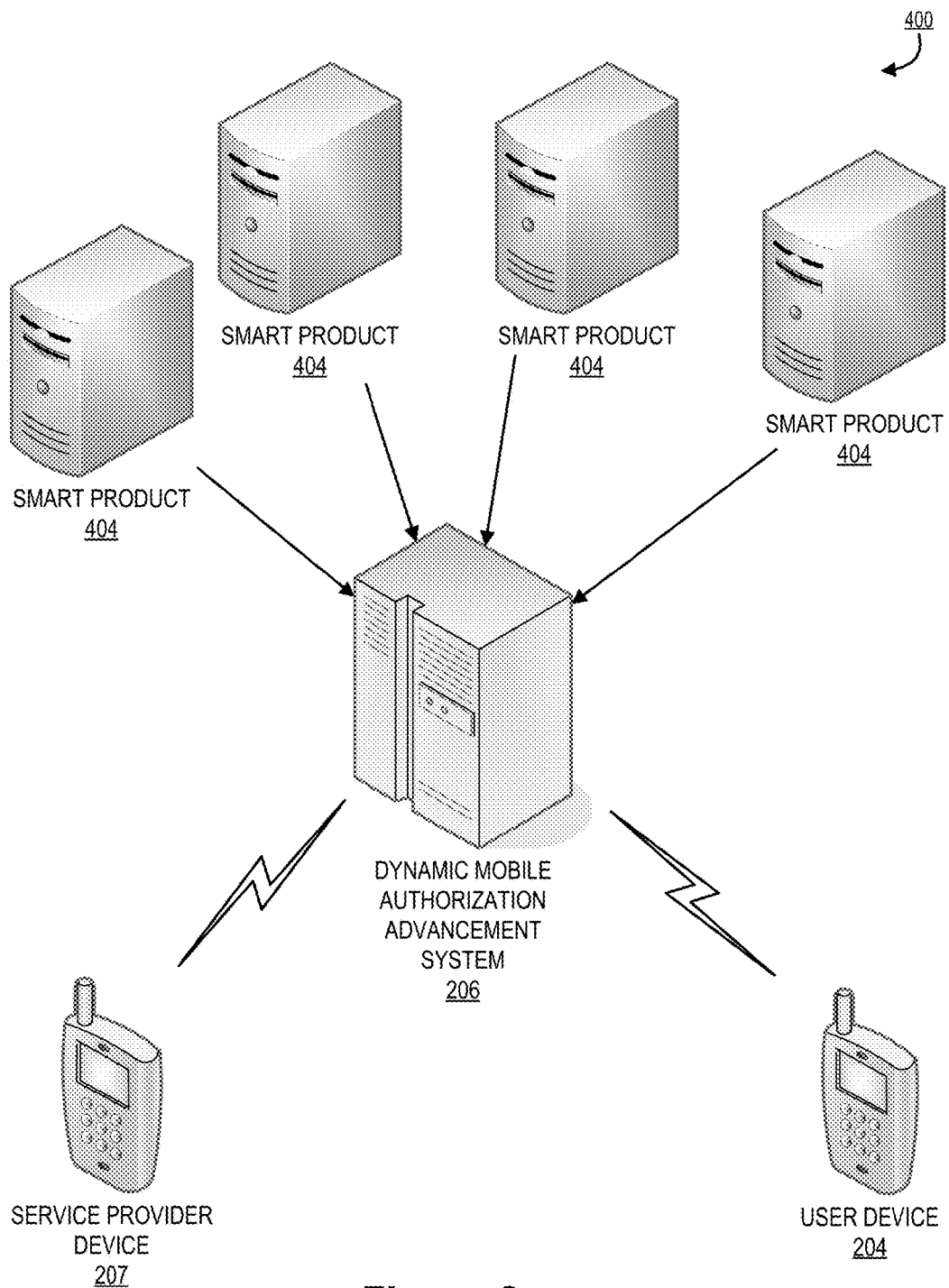
Figure 3:
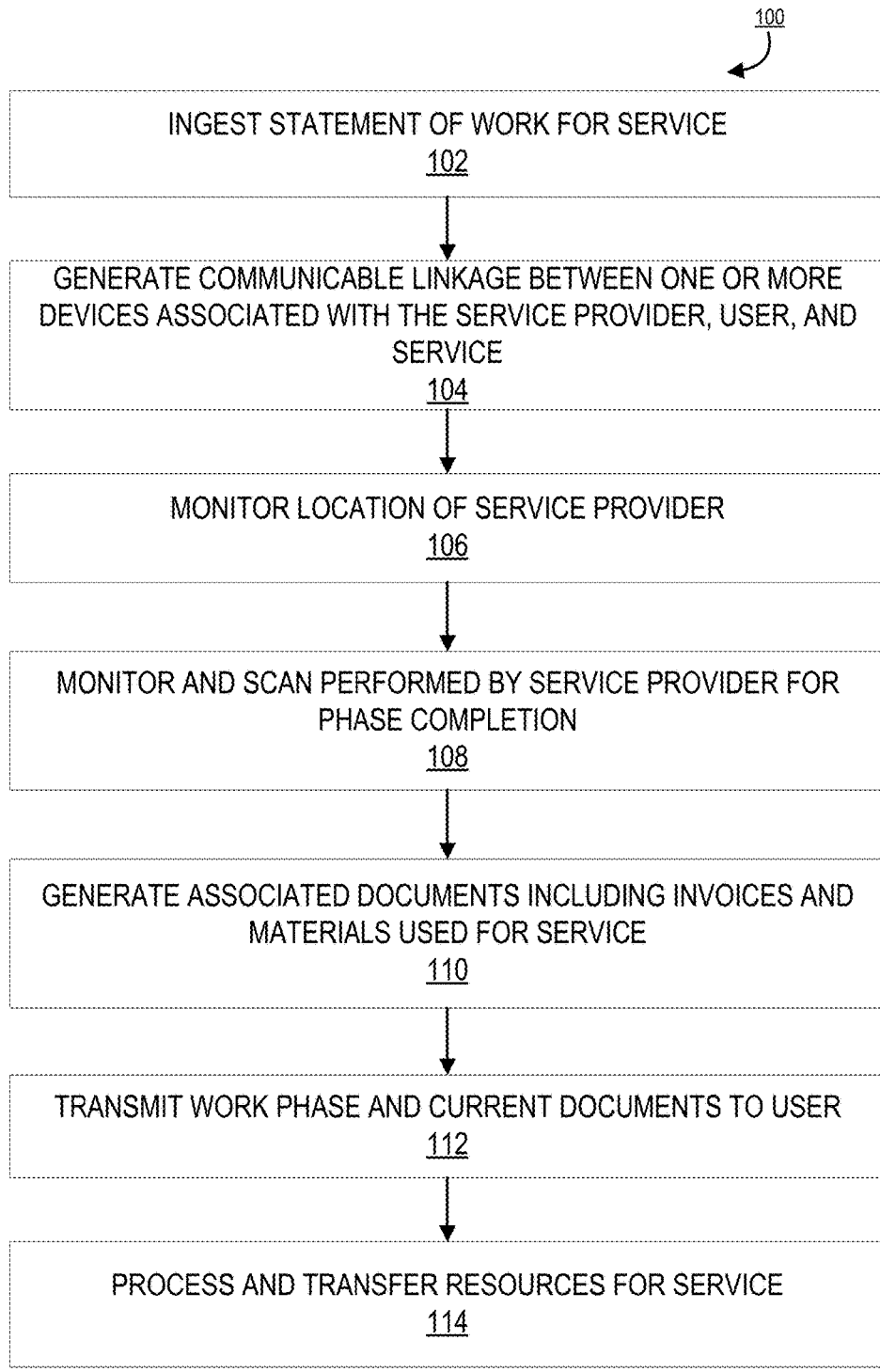
Figure 4:
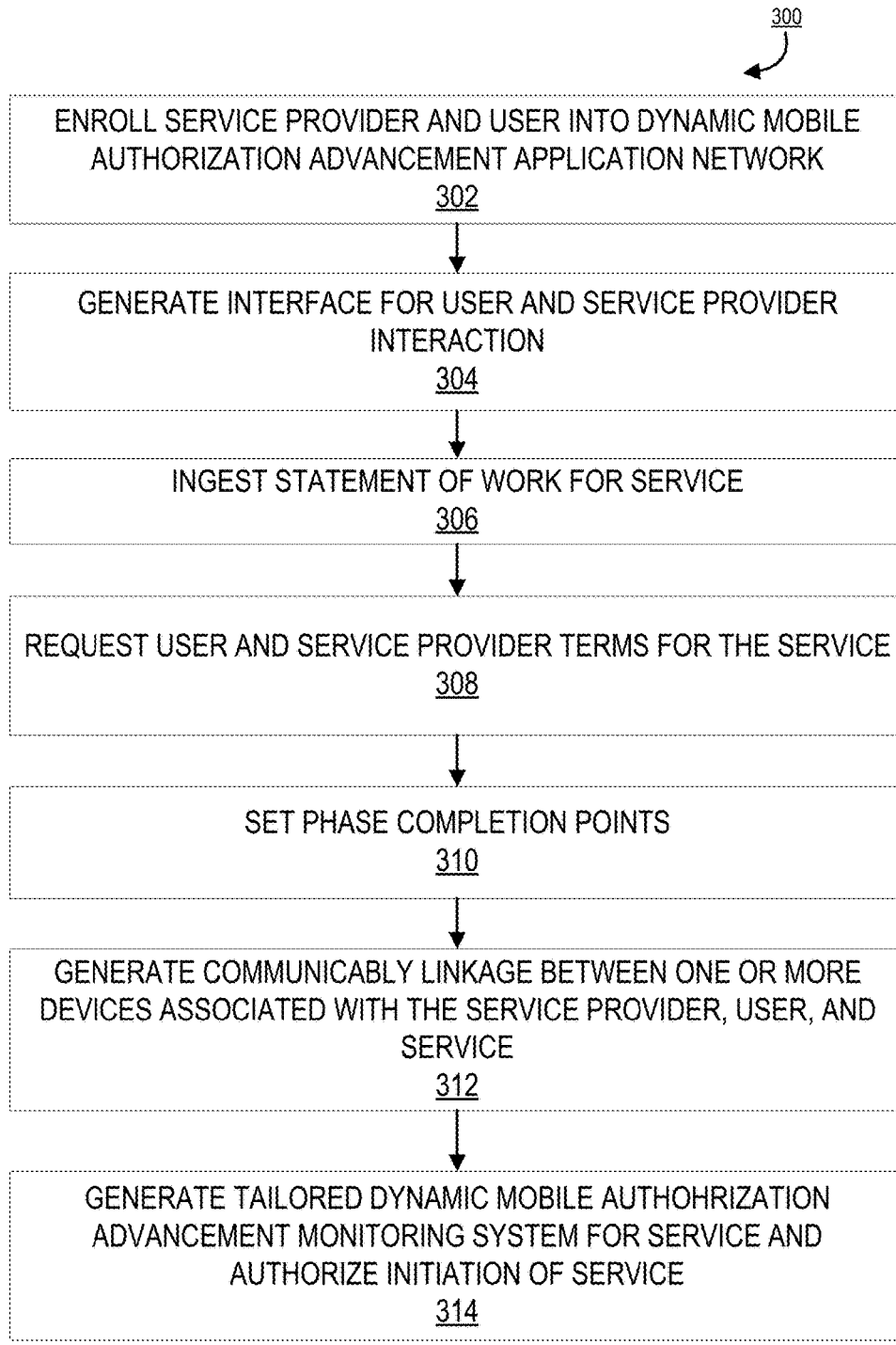
Figure 5:
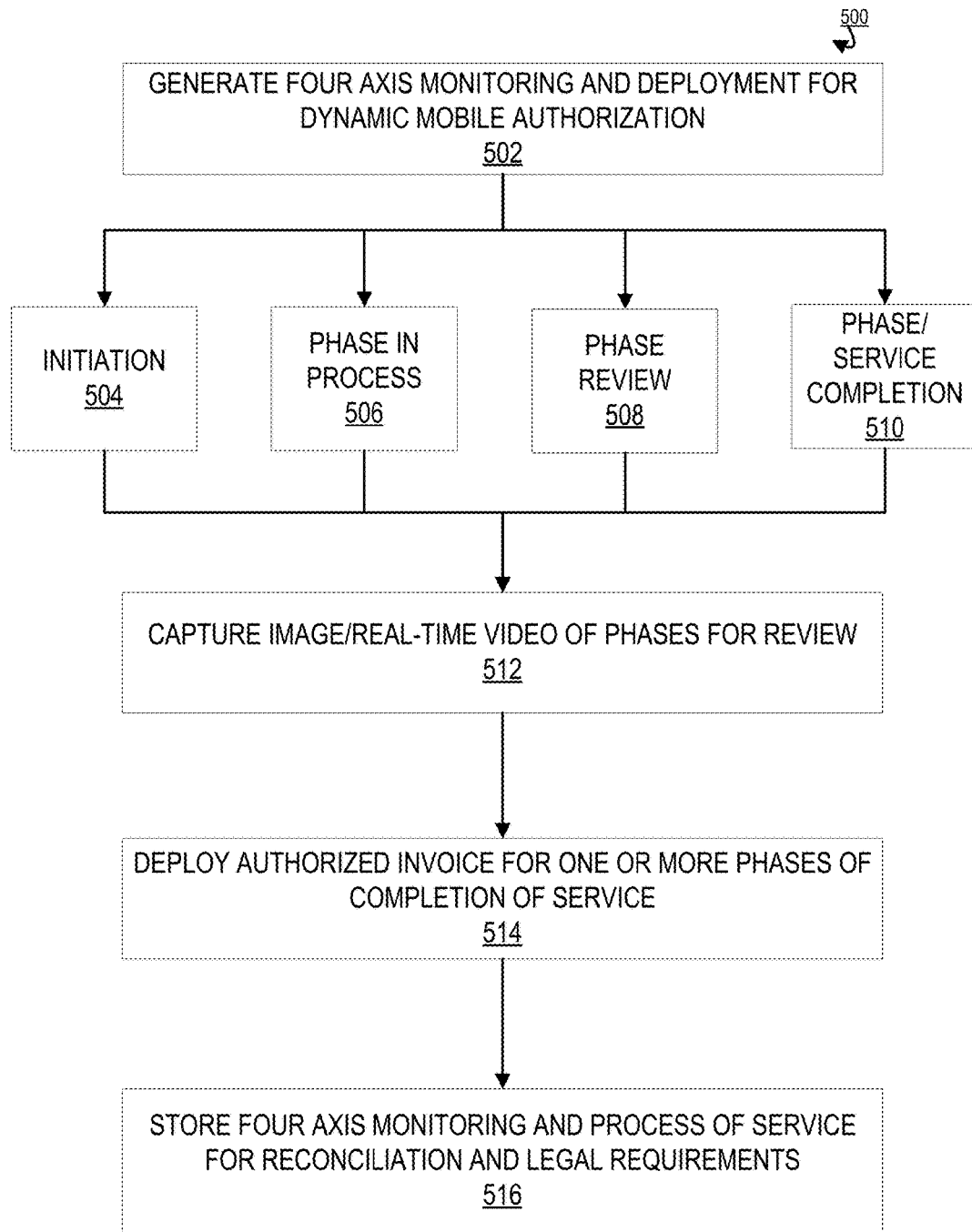

Having thus described embodiments of the invention in general terms, reference will now be made to the accompanying drawings, wherein:

FIG. 1 provides a dynamic mobile authorization system environment, in accordance with one embodiment of the present invention;

FIG. 2 provides a dynamic mobile authorization advancement implementation and communication system architecture, in accordance with one embodiment of the present invention;

FIG. 3 provides a high level process flow illustrating dynamic mobile authorization processing, in accordance with one embodiment of the present invention;

FIG. 4 provides a high level process flow illustrating initiation of the dynamic mobile authorization processing for a service, in accordance with one embodiment of the present invention; and FIG. 5 provides a process map illustrating a dynamic mobile authorization process, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to an individual owning, using, or operating a product or machine. In other embodiments, a user may be an entity owning or using a product or machine. For purposes of this invention, the term "user" and "user" may be used interchangeably.

Furthermore, as used herein the term "user device" or "mobile device" may refer to mobile phones, personal computing devices, tablet computers, wearable devices, and/or any portable electronic device capable of receiving and/or storing data therein.

A "service" as used herein includes any task, labor, product, or the like provided to a user from a third party service provider that may include a company, individual, or the like.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In some embodiments, the invention solves a technical problem of authenticity, authorization, and security of a transaction and the auditing process associated therewith. In this way, the system generates confirmation of an authenticity of a person, an authorized work completion, service payment completion, and transactional security. As such, creating an end-to-end holistic service providing experience. The system creates an audit and verification of a transaction based on the work effort in a four axis system that ties in to work product to ensure a service is rendered since the system is unbiased arbitrator based on an ingested statement of work.

In some embodiments, for example, a mobile service provider may receive a call for mobile service. An internet-of-things enabled device, such as the mobile service provider vehicle may track the vehicle location. After the service is completed, a device associated with the user, customer, service provider, or the like may capture images of the work and provides the images for scanning of the work for completeness. In some embodiments, the invention then generate associated documents, included needed invoices/receipts and automatically sends to the customer device for inspection/payment. The receipt then initiates payment from a resource distribution account after inspection and confirmation of work. The service provider may move on to a next project while the user may not be on site.

In some embodiments, the project may be broken down by the system into one or more phases to allow the user to mark approval at one or more checkpoint times during each phase. The phases may also include materials used, reputation of suppliers to add confidence in the process, or the like. The user may be notified of the phase of the service, completion of the service, material requests, additional resource requests or approvals, and the like via text message, email, video recording, or the like. The user may be able to set terms for communicating with the user, such as a need to approve any materials over a price point, phase completion, or the like.

In some embodiments, the system may automatically register a user during an initial contact with a service provider. The service provider may set up a unique user interface to start the service contract term determination process. The system may associate the supporting devices, such as a body camera, action recording, internet-of-things devices, mobile device, user devices, or the like. Such that various user requested phases or service providing portions may be monitored based on user request. Upon completion of the service, completion of the phase, or completion of an agreed upon amount, the system may integrate a resource distribution option for the user to provide the service provider with resources for that portion of the service provided.

In some embodiments, the invention provides geo-location tying to a recording cloud of activities associated with service providing to ensure fulfillment and delivery of services. As such, with the system may be an arbitrator, if necessary, recording the steps of the service agreement and service provided.

FIG. 1 illustrates a dynamic mobile authorization system environment 200, in accordance with one embodiment of the present invention. FIG. 1 provides the system environment 200 for which the distributive network system with specialized data feeds. FIG. 1 provides a unique system that includes specialized servers and system communicably linked across a distributive network of nodes required to perform the functions of tag generation, implementation, and function.

As illustrated in FIG. 1, the dynamic mobile authentication advancement system 206 is operatively coupled, via a network 201 to the user device 204 and service provider devices 207. In this way, the dynamic mobile authentication advancement system 206 can send information to and receive information from the user device 204 and the service provider devices 207. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual or entity that may be requesting or responsible for services being provided for the user, user location, home, entity, property, or the like. In some embodiments, the user 202 has a user device, such as a mobile phone, tablet, computer, or the like. FIG. 1 also illustrates a user device 204. Which is even further described below. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the dynamic mobile authentication advancement system 206 and the service provider devices 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to receive communications from the dynamic mobile authorization advancement system 206.

In some embodiments, the service provider 209 is an individual or entity that may be requested or responsible for services being provided to the user, at a user location, at a user home, at a user entity, at a user property, or the like. In some embodiments, the service provider 209 has a service provider device 207, such as a mobile phone, tablet, computer, or the like. FIG. 1 also illustrates a service provider device 207. Which is even further described below. The service provider device 207 may be, for example, a desktop personal computer, a mobile system, such as a cellular phone, smart phone, personal data assistant (PDA), laptop, internet-of-things product, or the like. The service provider device 207 generally comprises the same or similar devices as the user device 204, which may include a communication device, a processing device, and a memory device.

As further illustrated in FIG. 1, the dynamic mobile authentication advancement system 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the service provider devices 207 and the user device 204. As such, the communication device 246 generally comprises a modem, server, or other device for communicating with other devices on the network 201.

As further illustrated in FIG. 1, the dynamic mobile authentication advancement system 206 comprises computer-readable instructions 254 stored in the memory device 250, which in one embodiment includes the computer-readable instructions 254 of an authorization application 258. In some embodiments, the memory device 250 includes data storage 252 for storing data related to the system environment, but not limited to data created and/or used by the authorization application 258.

In one embodiment of the dynamic mobile authentication advancement system 206 the memory device 250 stores an authorization application 258. In one embodiment of the invention, the authorization application 258 may associate with applications having computer-executable program code. In one embodiment, the computer-executable program code of an application associated with the authorization application 258 may also instruct the processing device 248 to perform certain logic, data processing, and data storing functions of the application.

As illustrated in FIG. 1, the service provider devices 207 is connected to the user device 204 and dynamic mobile authentication advancement system 206. The service provider devices 207 has the same or similar components as described above with respect to the user device 204 and the dynamic mobile authentication advancement system 206. While only one service provider devices 207 is illustrated in FIG. 1, it is understood that multiple service provider devices 207 may make up the system environment 200. The service provider devices 207 may be associated with one or more merchants, distributors, manufacturers, auction agencies, pricing agencies, or the like. As such, the tag system 208, dynamic mobile authentication advancement system 206, and the user device 204 may communicate with the distributor such that a price for a product may be determined and a buyer for purchasing the product.

The user device 204 and the service provider devices 207 may further include a processing device communicably coupled to devices as a memory device, output devices, input devices, a network interface, a power source, a clock or other timer, a camera, a positioning system device, a gyroscopic device, one or more chips, and the like.

In some embodiments, the user device 204 and the service provider devices 207 access one or more databases or datastores (not shown) to search for and/or retrieve information related to the service. In some embodiments, the user device 204 and the service provider devices 207 access both a memory and/or datastore local to the user device 204 and the service provider devices 207 as well as a datastore remotely available to the user device 204 and the service provider devices 207.

The processing device may include functionality to operate one or more software programs or applications, which may be stored in the memory device. For example, the processing device may be capable of operating a connectivity program, such as a web browser application. The web browser application may search for one or more valuations of the products the user device 204 and the service provider devices 207 is affixed thereto. In this way, the web browser application may search web sites. In this way, the user device 204 and the service provider devices 207 may transmit and receive web content, such as, for example, product valuation, service agreements, location-based content, and/or other web page content, according to a Wireless Application Protocol (WAP), Hypertext Transfer Protocol (HTTP), and/or the like.

The processing device may also be capable of operating applications. The applications may be downloaded from a server and stored in the memory device of the user device 204 and the service provider devices 207. Alternatively, the applications may be pre-installed and stored in a memory in a chip.

The chip may include the necessary circuitry to provide dynamic mobile transaction authorization advancement processing integration within the user device 204 and the service provider devices 207. Generally, the chip will include data storage which may include data associated with the service that the user device 204 and the service provider devices 207 may be communicably associated therewith. The chip and/or data storage may be an integrated circuit, a microprocessor, a system-on-a-chip, a microcontroller, or the like. In this way, the chip will included data storage. Of note, it will be apparent to those skilled in the art that the chip functionality may be incorporated within other elements in the user device 204 and the service provider devices 207. For instance, the functionality of the chip may be incorporated within the memory device and/or the processing device. In a particular embodiment, the functionality of the chip is incorporated in an element within the user device 204 and the service provider devices 207. Still further, the chip functionality may be included in a removable storage device such as an SD card or the like.

The processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the user device 204 and/or the service provider devices 207 may be configured to operate with one or more air interface standards, communication protocols, modulation types, and access types. By way of illustration, the user device 204 and/or the service provider devices 207 may be configured to operate in accordance with any of a number of first, second, third, and/or fourth-generation communication protocols and/or the like. For example, the user device 204 and/or the service provider devices 207 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 204 and/or the service provider devices 207 may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The user device 204 and/or the service provider devices 207 may have an interface that includes user output devices and/or input devices. The output devices may include a display (e.g., a liquid crystal display (LCD) or the like) and a speaker or other audio device, which are operatively coupled to the processing device. The input devices, which may allow the user device 204 and/or the service provider devices 207 to receive data from a user 202 and/or service provider 209, may include any of a number of devices allowing the user device 204 and/or the service provider devices 207 to receive data from a user 202 and/or the service provider 209, such as a keypad, keyboard, touch-screen, touchpad, microphone, mouse, joystick, other pointer device, button, soft key, and/or other input device(s).

The user device 204 and/or the service provider devices 207 may further include a power source. Generally, the power source is a device that supplies electrical energy to an electrical load. In some embodiment, power source may convert a form of energy such as solar energy, chemical energy, mechanical energy, or the like to electrical energy. Generally, the power source in a user device 204 and/or the service provider devices 207 may be a battery, such as a lithium battery, a nickel-metal hydride battery, or the like, that is used for powering various circuits, e.g., the transceiver circuit, and other devices that are used to operate the user device 204 and/or the service provider devices 207. Alternatively, the power source 315 may be a power adapter that can connect a power supply from a power outlet to the user device 204 and/or the service provider devices 207. In such embodiments, a power adapter may be classified as a power source "in" the user device 204 and/or the service provider devices 207.

The user device 204 and/or the service provider devices 207 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the user device 204 and/or the service provider devices 207 described herein.

The user device 204 and/or the service provider devices 207 further comprise a gyroscopic device. The positioning system, input device, and the gyroscopic device may be used in correlation to identify phases within a service term.

In some embodiments, the user device 204 and/or the service provider devices 207 may identify the activity associated with a service. The user device 204 and/or the service provider devices 207 may do this via the gyroscopic device, positioning system device, camera, and the like. As such, the user device 204 and/or the service provider devices 207 may identify when a product is being used, how often it is being used, the phase of the service, and the like.

FIG. 2 illustrates a dynamic mobile authorization advancement implementation and communication system architecture 400, in accordance with one embodiment of the present invention. As illustrated, one or more smart products 404 are identified as being associated with the service being provided. This includes any smart products 404 that are associated with the user, the service provider, the location of the service, or the like. These may include tools, vehicles, items within a home, and/or materials associated with the service being provided. A "smart product" as used herein means a product, machine, and/or the like that is associated with the service being provided, the user, the service provider, or the location of the service being provided that is capable of communicating with and transmitting information or data to and/or receiving information or data from other devices, systems or apparatuses including over the network 201.

FIG. 2 illustrates several smart products 404. A smart product or device may be for example, but not limited to, a machine such as an automobile, tractor trailer, airplane, manufacturing device, warehouse devices, material handling system, conveyor system, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of smart products 404 or smart devices provided herein is not exhaustive such that the smart product may be any device that includes a communication interface or module, software and/or hardware that allow the device to communicate data and/or information related to the device with other devices and/or systems over network.

One exemplary embodiment of a smart product 404 may generally include, but is not limited to, a network communication interface, a processing device, and a memory device such as described herein. The processing device is operatively coupled to the network communication interface and the memory device. The smart product 404 may also have a control system for controlling the physical operation of the device. The control system may comprise one or more sensors for detecting operating conditions of the various mechanical and electrical systems that comprise the smart product 404 or of the environment in which the smart product 404 is used. The sensors may communicate with the processing device to provide feedback to the operating systems of the device. The control system may also comprise metering devices for measuring performance characteristics of the smart device. The control system may also comprise controllers such as programmable logic controllers (PLC), proportional integral derivative controllers (PID) or other machine controllers. The smart device may also comprise various electrical, mechanical, hydraulic or other systems that perform various functions of the smart device. These systems may comprise, for example, electrical circuits, motors, compressors, or any system that enables functioning of the smart device.

In one embodiment, applications having computer-executable program code that instruct the processing device to operate the various systems of the smart product 404 including network communication interface to perform certain communication functions and to perform certain logic, data processing, and data storing functions of the application as described herein are stored in memory device.

The smart products 404 may also include a resource distribution communication interface device that allows the smart product 404 to be connected to and to communicate with a resource distribution device. The communication interface device may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface the smart product 404 may also include a communication interface device that may be connected by a hardwire connection to the resource distribution device. The interface device may comprise a connector such as a USB, SATA, PATA, SAS or other data connector for transmitting data to and from the smart device. In some embodiments the smart device may comprise a port or plug that is compatible with a mating port or plug on the resource distribution interface device. In some embodiments the network communication interface may function as both the network interface device and the resource distribution device communication interface.

As illustrated, the smart product 404 may comprise one or more of the applications and processors. The smart product 404 may communicate directly with the dynamic mobile authorization advancement system 206. As such, the smart product 404 may communicate with the dynamic mobile authorization advancement system 206 to provide the dynamic mobile authorization advancement system 206 with one or more valuations or information about the service being provided, the materials of the service, and the like.

The dynamic mobile authorization advancement system 206 may also receive communication from the user device 204 and the service provider device 207. This communication may be in the form of a video, text, image, or the like. These may include service terms, phase terms, material costs, service status images, service completion, phase completion, or the like.

In some embodiments, the dynamic mobile authorization advancement system 206 may process information received from the smart products 404, the user device 204, and the service provider device 207 in order to generate a dynamic mobile authorization processing for the user and service provider as described in the flow charts below.

In some embodiments, the dynamic mobile authorization advancement system 206 may provide the user device 204 with documents, updated, notifications, and the like associated with the service being provided.

FIG. 3 provides a high level process flow illustrating dynamic mobile authorization processing 100, in accordance with one embodiment of the present invention. As illustrated in block 102, the process 100 is initiated by ingestion of the statement of work for the service being provided. In this way, a service provider is preparing for initiation of a service to a user. Included in the ingested statement of work for service, and further described below in FIG. 4 may be any user terms, phase parsing, material cost limitations, billing requirements, or the like.

Next, as illustrated in block 104, the process 100 continues by generating a communicable linkage between one or more devices associated with the service provider, user, and service. In this way, the user device and service provider device may be linked via the dynamic mobile authorization advancement system for providing dynamic mobile authorization advancement. The user device and service provider device may be linked via the system for communication at various points during the service. This communication may be text, video stream, real-time video stream, image capture, audio, or the like. Furthermore, the system may identify one or more smart products associated with the user, service provider, or location of the service. These one or more smart products may be objects, vehicles, materials, products, or the like capable of performing communication with the system. The smart products may link to the system for confirmation of materials used, progress of service, completion of service, or the like.

As illustrated in block 106 once the statement of work has been finalized and the devices linked to the user, service provider, or service have been linked, the process 100 continues by initiating monitoring of the location of the service provider. As such, the system may monitor the location of the service provider to provide the user with an indication that the service provider is coming to the user location to perform the service, is already located at the service location, or has not initiated traveling to the location of the service.

Next, as illustrated in block 108, the process 100 continues by allowing system manipulation of devices to monitor and scan the performance of the service provider to identify phase stage and phase completion. The system may allow the user to approve the progress, as questions to the service provider, approve materials used for the service, provide resources to the service provider, and the like.

As illustrated in block 110, the process 100 continues by generating the associated documents and information about the service and the stage of the service, including the invoices and materials used for the service, images of the service being performed, and the like. As such, the system may document the progress of the service and completion of the same. The system may archive the documentation of the progress for later reconciliation.

For example, a user may request a locksmith replace a lock on the user's door to his/her home. The system may monitor the locksmith selection of the lock and allow the user to, in real-tine, approve the selection of the lock for the door. Upon approval, the locksmith may travel to the user's home and perform the service of installing the new lock. The system, via the service provider devices, smart products, and the like may take real-time video, images, or text of the locksmith selection of the lock, travel, and process of completion of the service. The system may confirm the completion and transmit an invoice to the user for the lock service provided. In this way, the system then stores the tracked information for latter reconciliation or arbitration upon any issue with the completed work.

Finally, as illustrated in block 112, the process 100 continues upon transmission of the work phase progress, such as images, videos, or the like and any current documents, such as invoices, materials selection, or the like to the user. Finally, as illustrated in block 114, the process 100 is completed by processing the service completion and transferring resources for the service from an account associated with the user to an account associated with the service provider.

In this way, the invention solves a technical problem of authenticity, authorization, and security of a transaction and the auditing process associated therewith. In this way, the system generates confirmation of an authenticity of a person, an authorized work completion, service payment completion, and transactional security. As such, creating an end-to-end holistic service providing experience. The system creates an audit and verification of a transaction based on the work effort in a four axis system that ties in to work product to ensure a service is rendered since the system is unbiased arbitrator based on an ingested statement of work.

In some embodiments, for example, a mobile service provider may receive a call for mobile service. An internet-of-things enabled device, such as the mobile service provider vehicle may track the vehicle location. After the service is completed, a device associated with the user, customer, service provider, or the like may capture images of the work and provides the images for scanning of the work for completeness. In some embodiments, the invention then generate associated documents, included needed invoices/receipts and automatically sends to the customer device for inspection/payment. The receipt then initiates payment from a resource distribution account after inspection and confirmation of work. The service provider may move on to a next project while the user may not be on site.

In some embodiments, the project may be broken down by the system into one or more phases to allow the user to mark approval at one or more checkpoint times during each phase. The phases may also include materials used, reputation of suppliers to add confidence in the process, or the like. The user may be notified of the phase of the service, completion of the service, material requests, additional resource requests or approvals, and the like via text message, email, video recording, or the like. The user may be able to set terms for communicating with the user, such as a need to approve any materials over a price point, phase completion, or the like.

In some embodiments, the system may automatically register a user during an initial contact with a service provider. The service provider may set up a unique user interface to start the service contract term determination process. The system may associate the supporting devices, such as a body camera, action recording, internet-of-things devices, mobile device, user devices, or the like. Such that various user requested phases or service providing portions may be monitored based on user request. Upon completion of the service, completion of the phase, or completion of an agreed upon amount, the system may integrate a resource distribution option for the user to provide the service provider with resources for that portion of the service provided.

In some embodiments, the invention provides geo-location tying to a recording cloud of activities associated with service providing to ensure fulfillment and delivery of services. As such, with the system may be an arbitrator, if necessary, recording the steps of the service agreement and service provided.

FIG. 4 provides a high level process flow illustrating initiation of the dynamic mobile authorization processing for a service 300, in accordance with one embodiment of the present invention. As illustrated in block 302, the process 300 is initiated by enrolling the service provider and the user into the dynamic mobile authorization advancement application network. In some embodiments, the service provider may enroll his/her business into the network. Enrollment may require password authorization for access and entry. The user may be automatically enrolled into the application network based on approval of a statement of work with the service provider. The system may allow a minor to enroll via parental approval or some claimed support for accessing the system.

Next, as illustrated in block 304, the system may generate an interface for the user and service provider to interact with the dynamic mobile authorization advancement application network. This interface may be presented on a screen associated with the user device and the service provider device. The interface will allow the user to input requests for phases, select and confirm materials, select and confirm pricing, visualize work product, provide payment for service, and the like. The interface will allow the service provider to confirm the statement of work, confirm materials, confirm prices, confirm phases, present process video or images, and submit invoices.

As illustrated in block 306, the process 300 continues by ingesting the statement of work for a particular service to be performed. The statement of work may include a project or service that the service provider is to perform for the user, this may include a time frame, materials, cost, and the like. In some embodiments, the user may enroll in the application network upon ingestion of the statement of work.

As illustrated in block 308, once the statement of work has been ingested by the system, the system allows the user and the service provider via a request on the interface for additional terms for the service. These additional terms may include phase approvals, materials approvals, material pricing, update requirements, payment terms, and the like. Along with the terms for the service, the system may request that the user and service provider set the phase completion points, as illustrated in block 310.

As illustrated in block 312, the set up process 300 continues by generating a communicably linkage between one or more devices associated with the service provider, user, and the service. In this way, the user device and service provider device may be linked via the dynamic mobile authorization advancement system for providing dynamic mobile authorization advancement. The user device and service provider device may be linked via the system for communication at various points during the service. This communication may be text, video stream, real-time video stream, image capture, audio, or the like. Furthermore, the system may identify one or more smart products associated with the user, service provider, or location of the service. These one or more smart products may be objects, vehicles, materials, products, or the like capable of performing communication with the system. The smart products may link to the system for confirmation of materials used, progress of service, completion of service, or the like.

Finally, the set up process 300 is completed by generating a tailored dynamic mobile authorization advancement monitoring system for service and authorization of initiation of service, as illustrated in block 314. As such, the initiation of the authorization and monitoring of service provided by a service provider may be activated for the service to commence.

FIG. 5 provides a process map illustrating a dynamic mobile authorization process 500, in accordance with one embodiment of the present invention. As illustrated in block 502, the process 500 is initiated by generating a four axis monitoring and deployment system for dynamic mobile authorization. The four axis monitoring may include monitoring at the initiation 504, phase in progress 506, phase review 508, and phase/service completion 510. In some embodiments, the initiation 504 axis includes the initiation of the service such as generating the statement of work, service provider initiation of driving to the service location, documenting service location prior to service, and tracking of that initiation process. In some embodiments, the phase in process 506 axis includes monitoring, via video and image, the process and progress of the service provider during performing the service. In some embodiments, the phase review 508 axis includes user review of the phase and approval for advancement to the next phase. In some embodiments, the phase/service completion 510 axis includes confirming completion of the service via the video and/or images and generating the invoices for the service performed.

As illustrated in block 512, during these axis of monitoring, the system may capture images and/or real-time video during the phases for reviewing and retention during the four axis monitoring. In some embodiments, the service may be provided by a service provider. In some embodiments, the service may be provided by a sub-contractor. The system may perform due diligence on the service provider and any sub-contractors for review of the individual, work product, ethical aspects of the individual, and the like.

In some embodiments, the user may be allowed to review and approve each phase of the service being performed. Furthermore, the system may integrate with a third party application that allows posting and confirmation of the service. In this way, the system may receive opinions from expert service members on the third party application indicating that the service for the user was performed correctly or to code.

As illustrated in block 514, the system may also deploy authorized invoices at time frames for one or more phases, service completion, or the like. These invoices may also include materials lists and/or material selection requests. In this way, the service provider may provide the user with one or more material suggestions and prices. The user may select that material for the service and an invoice for that material may be generated. Furthermore, the service provider may be able to utilize augmented reality or real-time video streaming in order to present a visual representation of the various materials available for the user.

Finally, as illustrated in block 516, the system may store, in a data repository, the four axis monitoring and process of the service for reconciliation, warrantee, and legal requirements. The system may store the data for the statute of limitations or for the work warrantee duration.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamic mobile service authorization, the system comprising:
   a memory device with computer-readable program code stored thereon;
   a communication device;
   a processing device operatively coupled to the memory device and the communication device, wherein the processing device is configured to execute the computer-readable program code to:
      enroll a service provider and identify one or more smart devices associated with the service provider;
      receive a statement of work for service to be preformed by the service provider for a user;
      generate a communicable linkage between a user device, a service provider device, and one or more smart devices, wherein the one or more smart devices are associated with the service provider and/or located at a location of the service to be performed;
      monitor a location of the service provider via one or more smart devices associated with the service provider;
      capture during service, by accessing and manipulating devices within the generated communicable linkage, one or more phases of the service being performed by the service provider;
      transmit a signal to the user device for confirmation of the one or more phase associated with the service, wherein the confirmation comprises a captured portion of the service;
      transmit a confirmation signal to the service provider device allowing completion of the service, wherein the confirmation signal is based on a confirmation of the one or more phases by the user;
      deploy one or move resource invoices for the services provided; and store the statement of work, the captured one or more phases of the service, and the confirmation of the one or more phases the statement of work for legal reconciliation.

2. The system of claim 1, wherein storing the statement of work, the captured one or more phases of the service, and the confirmation of the one or more phases the statement of work for legal reconciliation further comprises storing an unbiased record of the service, statement of work, and compliance with the statement of work for the service provided to the user.

3. The system of claim 1, wherein capturing the service further comprises capturing via image and real-time video stream one or more portions of the service by an accessed and manipulated user device, a service provider device, and one or more smart devices.

4. The system of claim 1, further comprising providing a notification to the service provider to stop the service based on a required phase completion and phase confirmation of the user.

5. The system of claim 1, further comprising generating an interactive interface for term definition of service and indication of phases of service upon generation of the communicable linkage between the user device and the service provider device.

6. The system of claim 1, wherein monitoring the location of the service provider via one or more smart devices associated with the service provider further comprises the one or more smart devices associated with a vehicle of the service provider.

7. The system of claim 1, wherein receiving the statement of work for service to be performed by the service provider for the user further comprises automatically enrolling the user for the dynamic mobile service authorization based on the statement of work.

8. The system of claim 1, wherein the service further comprises one or more manual tastes for completion at a user resident or location.

9. A computer program product for dynamic mobile service authorization, the computer program product comprising at least one non-transitory computer-readable medium having computer-readable program code portions embodied therein, the computer-readable program code portions comprising:
an executable portion configured for enrolling a service provider and identify one or more smart devices associated with the service provider;
an executable portion configured for receiving a statement of work for service to be preformed by the service provider for a user;
an executable portion configured for generating a communicable linkage between a user device, a service provider device, and one or more smart devices, wherein the one or more smart devices are associated with the service provider and/or located at a location of the service to be performed;
an executable portion configured for monitoring a location of the service provider via one or more smart devices associated with the service provider;
an executable portion configured for capturing during service, by accessing and manipulating devices within the generated communicable linkage, one or more phases of the service being performed by the service provider;
an executable portion configured for transmitting a signal to the user device for confirmation of the one or more phase associated with the service, wherein the confirmation comprises a captured portion of the service;
an executable portion configured for transmitting a confirmation signal to the service provider device allowing completion of the service, wherein the confirmation signal is based on a confirmation of the one or more phases by the user;
an executable portion configured for deploying one or move resource invoices for the services provided; and
an executable portion configured for storing the statement of work, the captured one or more phases of the service, and the confirmation of the one or more phases the statement of work for legal reconciliation.

10. The computer program product of claim 9, wherein storing the statement of work, the captured one or more phases of the service, and the confirmation of the one or more phases the statement of work for legal reconciliation further comprises storing an unbiased record of the service, statement of work, and compliance with the statement of work for the service provided to the user.

11. The computer program product of claim 9, wherein capturing the service further comprises capturing via image and real-time video stream one or more portions of the service by an accessed and manipulated user device, a service provider device, and one or more smart devices.

12. The computer program product of claim 9, further comprising an executable portion for providing a notification to the service provider to stop the service based on a required phase completion and phase confirmation of the user.

13. The computer program product of claim 9, further comprising an executable portion configured for generating an interactive interface for term definition of service and indication of phases of service upon generation of the communicable linkage between the user device and the service provider device.

14. The computer program product of claim 9, wherein monitoring the location of the service provider via one or more smart devices associated with the service provider further comprises the one or more smart devices associated with a vehicle of the service provider.

15. The computer program product of claim 9, wherein receiving the statement of work for service to be performed by the service provider for the user further comprises automatically enrolling the user for the dynamic mobile service authorization based on the statement of work.

16. The computer program product of claim 9, wherein the service further comprises one or more manual tastes for completion at a user resident or location.

17. A computer-implemented method for dynamic mobile service authorization, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
enrolling a service provider and identify one or more smart devices associated with the service provider;
receiving a statement of work for service to be performed by the service provider for a user;
generating a communicable linkage between a user device, a service provider device, and one or more smart devices, wherein the one or more smart devices are associated with the service provider and/or located at a location of the service to be performed;

monitoring a location of the service provider via one or more smart devices associated with the service provider;

capturing during service, by accessing and manipulating devices within the generated communicable linkage, one or more phases of the service being performed by the service provider;

transmitting a signal to the user device for confirmation of the one or more phase associated with the service, wherein the confirmation comprises a captured portion of the service;

transmitting a confirmation signal to the service provider device allowing completion of the service, wherein the confirmation signal is based on a confirmation of the one or more phases by the user;

deploying one or move resource invoices for the services provided; and storing the statement of work, the captured one or more phases of the service, and the confirmation of the one or more phases the statement of work for legal reconciliation.

18. The computer-implemented method of claim 17, wherein storing the statement of work, the captured one or more phases of the service, and the confirmation of the one or more phases the statement of work for legal reconciliation further comprises storing an unbiased record of the service, statement of work, and compliance with the statement of work for the service provided to the user.

19. The computer-implemented method of claim 17, wherein capturing the service further comprises capturing via image and real-time video stream one or more portions of the service by an accessed and manipulated user device, a service provider device, and one or more smart devices.

20. The computer-implemented method of claim 17, further comprising providing a notification to the service provider to stop the service based on a required phase completion and phase confirmation of the user.

* * * * *